(12) United States Patent
Biertümpfel et al.

(10) Patent No.: US 12,415,342 B2
(45) Date of Patent: Sep. 16, 2025

(54) LAMINATED GLASS AND ITS USE

(71) Applicant: Schott AG, Mainz (DE)

(72) Inventors: Ralf Biertümpfel, Mainz (DE); Frank Wolff, Mainz (DE)

(73) Assignee: Schott AG, Mainz (DE)

( * ) Notice: Subject to any disclaimer, the term of this patent is extended or adjusted under 35 U.S.C. 154(b) by 223 days.

(21) Appl. No.: 18/453,731

(22) Filed: Aug. 22, 2023

(65) Prior Publication Data
US 2024/0059050 A1 Feb. 22, 2024

(30) Foreign Application Priority Data
Aug. 22, 2022 (DE) ................... 10 2022 121 122.3

(51) Int. Cl.
*B32B 17/10* (2006.01)
*B32B 3/30* (2006.01)
(Continued)

(52) U.S. Cl.
CPC ............ *B32B 17/1011* (2013.01); *B32B 3/30* (2013.01); *B32B 7/027* (2019.01); *B32B 17/10036* (2013.01); *B32B 17/10045* (2013.01); *B32B 17/101* (2013.01); *B32B 17/10119* (2013.01); *C03C 3/11* (2013.01); *B32B 2307/308* (2013.01); *B32B 2307/4026* (2013.01);
(Continued)

(58) Field of Classification Search
CPC ................... B32B 17/101; B32B 17/10119
USPC ........................................... 428/167
See application file for complete search history.

(56) References Cited

U.S. PATENT DOCUMENTS 9,752,756 B2 * 9/2017 Biertuempfel ......... B64D 47/02
10,995,961 B2 5/2021 Weiss et al.
(Continued)

FOREIGN PATENT DOCUMENTS

DE 10 2014 106 698 B4 12/2015
DE 10 2017 127 579 B3 2/2019

*Primary Examiner* — Tahseen Khan
(74) *Attorney, Agent, or Firm* — TAYLOR & EDELSTEIN, PC

(57) ABSTRACT

A laminate includes at least two sheets, one of the at least two sheets including a colored glass and another of the at least two sheets being a further sheet. The sheet including the colored glass in a wavelength range from 875 nm to 1600 nm has an internal transmittance at at least one wavelength of at least 75%. A connecting layer is disposed between the at least two sheets. The laminate has a thickness of at most 6 mm. The laminate in a wavelength range from 400 to 700 nm has an average transmittance $\tau_{avg,400\,nm\,to\,700\,nm}$ of less than 15% where $\tau_{avg,400\,nm\,to\,700\,nm}$ is defined as $$\tau_{avg,400\,nm-700\,nm} = \frac{\int_{400\,nm}^{700\,nm} \tau d\lambda}{700\,nm - 400\,nm}$$

and/or at each wavelength has a spectral transmittance of less than 15%.

18 Claims, 1 Drawing Sheet

(51) Int. Cl.
  *B32B 7/027*   (2019.01)
  *C03C 3/11*    (2006.01)
(52) U.S. Cl.
  CPC ....... *B32B 2457/00* (2013.01); *B32B 2551/00* (2013.01); *B32B 2605/006* (2013.01)

(56) References Cited

U.S. PATENT DOCUMENTS

| | | | |
|---|---|---|---|
| 2018/0202666 A1* | 7/2018 | Mueller | H05B 3/74 |
| 2019/0308394 A1 | 10/2019 | Alkemper et al. | |
| 2021/0188696 A1 | 6/2021 | Grimm et al. | |
| 2023/0227348 A1* | 7/2023 | Schreder | C03C 4/20 |
| | | | 428/220 |

* cited by examiner

FIG. 1A
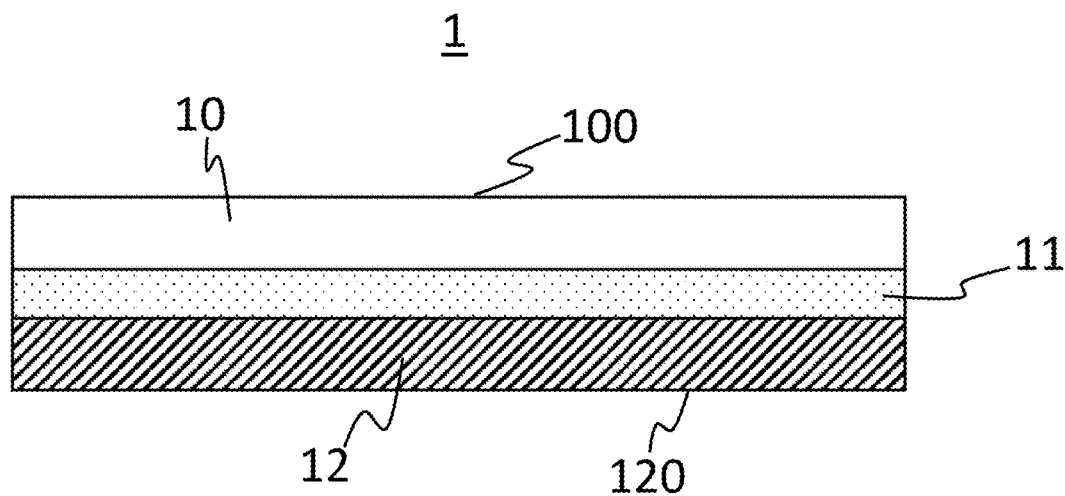
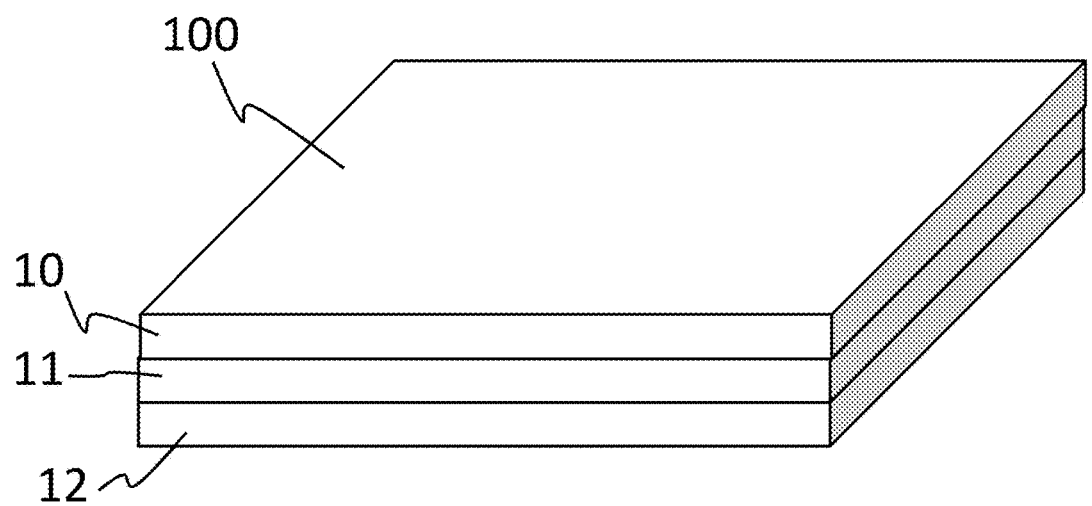
FIG. 1B

LAMINATED GLASS AND ITS USE

CROSS REFERENCE TO RELATED APPLICATIONS

This application claims priority to German Patent Application No. 10 2022 121 122.3 filed on Aug. 22, 2022, which is incorporated in its entirety herein by reference.

BACKGROUND OF THE INVENTION

1. Field of the Invention

The present invention relates generally to a laminated glass comprising at least two sheets and also to the use thereof.

2. Description of the Related Art

A laminated glass—also referred to simply as a laminate—is understood to be a sheet-like construction comprising at least two glass sheets which are connected to one another by an interlayer, generally one which comprises a polymer. Such laminated glass or composite glass has the advantage, in the event of fracture, that the individual fragments are still always connected to one another by the interposed polymer layer, thus reducing the risk of injury by glass splinters. For example, laminated glass sheets of these kinds are employed in the automotive industry as front or windshield glazing.

In principle, laminated glass sheets of these kinds may generally also be employed as cover sheets for the protection of components. For example, such cover sheets may be used in applications including the protection of components which comprise a laser, such as in a vehicle for measurement of distance, for example.

For safety reasons, however, it is necessary in that case that cover sheets of these kinds for components which comprise a laser have only low transmittance in the visible spectral range. Consequently, conventional laminated glass sheets are not candidates as a cover sheet for such components. The reason is that, while they do have sufficient mechanical and chemical stability, they are uncolored.

Additionally known are glass filters which have sufficiently high transmittance in the laser wavelength range and at the same time only low optical transmittance, i.e. in the visible spectral range. These so-called optical glasses, however, are not suitable for meeting the mechanical and chemical requirements which are imposed on cover sheets in the automotive sector.

Suitable so-called "technical glasses", i.e. vitreous materials of the kind used for glass sheets in laminated glass, cannot be colored.

Plastic layers or plastic windows as well are not suitable, since they lack sufficient temperature stability and solarization resistance. Plastics are also not moisture proof, and so the electronics requiring protection cannot be sealed over the long term.

Indeed, the surroundings of such coverings are harsh and encompass, for example, not only mechanical exposures such as stone chipping but also car washes, moisture exposure, temperature fluctuations, salt mist, solar irradiation, especially when used in the automotive sector.

There is therefore a need for cover sheets for electronic components, especially those which comprise a laser, that have a good optical filter effect and also sufficient mechanical and chemical stability for use in automotive applications.

SUMMARY OF THE INVENTION

Exemplary embodiments disclosed herein provide a laminated glass for use as a cover sheet that at least partly diminishes the aforesaid weaknesses of the prior art. A further aspect relates to the use of a laminated glass of this kind.

In some exemplary embodiments provided according to the present invention, a laminate includes at least two sheets, one of the at least two sheets including a colored glass and another of the at least two sheets being a further sheet. The sheet including the colored glass in a wavelength range from 875 nm to 1600 nm has an internal transmittance at at least one wavelength of at least 75%. A connecting layer is disposed between the at least two sheets. The laminate has a thickness of at most 6 mm. The laminate in a wavelength range from 400 to 700 nm has an average transmittance $\tau_{avg, 400\ nm\ to\ 700\ nm}$ of less than 15% where $\tau_{avg, 400\ nm\ to\ 700\ nm}$ is defined as $$\tau_{avg, 400\ nm-700\ nm} = \frac{\int_{400\ nm}^{700\ nm} \tau d\lambda}{700\ nm - 400\ nm}$$

and/or at each wavelength has a spectral transmittance of less than 15%.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1A illustrates a side view of an exemplary embodiment of a laminate provided according to the present invention; and FIG. 1B illustrates a perspective representation of a laminate having sheets and also a layer disposed between these sheets.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The present disclosure relates to a laminate comprising at least two sheets and a connecting layer disposed between the sheets. One sheet comprises a colored glass, wherein the laminate has a thickness of at most 6 mm and optionally at least 1 mm, and wherein the laminate in a wavelength range from 400 nm to 700 nm has an average transmittance $\tau_{avg, 400\ nm\ to\ 700\ nm}$ of less than 15%, optionally of less than 10%, where $\tau_{avg, 400\ nm\ to\ 700\ nm}$ is defined as $$\tau_{avg, 400\ nm-700\ nm} = \frac{\int_{400\ nm}^{700\ nm} \tau d\lambda}{700\ nm - 400\ nm}$$

and/or at each wavelength has a spectral transmittance of less than 15%, optionally less than 10%, optionally less than 5% and optionally of less than 1%, and wherein the sheet comprising the colored glass in the wavelength range from 875 nm to 1600 nm has an internal transmittance at at least one wavelength of at least 75%, at least 80%, optionally at least 85%, optionally at least 90%, optionally at least 95%, optionally at least 97%. A configuration of this kind is highly advantageous.

One sheet in the laminate comprises a colored glass. This also includes the case, in particular, where this sheet consists of a colored glass or is formed of a colored glass.

Through the use of a colored glass having the aforesaid transmittance properties in the visible spectral range, the resultant laminate is sufficiently opaque to the human eye. It is therefore not possible for a random viewer to be able to recognize what is disposed behind the laminate. The resulting perceived color is uniform. Furthermore, any damage to the eyes of the viewer can be prevented.

At the same time, however, the configuration of the laminate is such that the colored glass, optionally in the range of the laser wavelength, which may lie in the range from 875 nm to 1600 nm, has a very high internal transmittance at at least one wavelength of at least 75%, at least 80%, optionally at least 85%, optionally at least 90%, optionally at least 95%, optionally at least 97%. In other words, therefore, the colored glass has sufficient transparency for a laser beam.

In general it may be the case that the further sheet is likewise configured as a glass or comprises or consists of a glass, but not of colored glass, instead taking the form of an uncolored or clear glass-comprising sheet or consisting of uncolored or clear glass. The effect of this is to enable a particularly chemically and/or mechanically resistant configuration of the laminate. In the installed state of the laminate, the uncolored sheet specifically may advantageously face outwards, in other words away from the electronic component. It may be the case in particular here if the further sheet used is one which comprises or consists of a glass having a particularly chemically and/or mechanically resistant configuration. More particularly it may be the case that the further sheet is toughened.

According to some embodiments, the further sheet comprises a borosilicate glass, a soda-lime glass, optionally a chemically toughened soda-lime glass, an aluminium silicate glass, optionally a chemically toughened aluminium silicate glass, or a lithium aluminium silicate glass, optionally a chemical toughened lithium aluminium silicate glass.

The connecting layer disposed between the at least two sheets is such that the at least two sheets are held relative to one another as a result.

According to some embodiments, therefore, the further sheet comprises a glass, optionally a silicatic glass, optionally a glass which comprises the following components in wt % based on oxide:

$Al_2O_3$ 10-20
$K_2O$ 1-10
$Na_2O$ 10-20
$SiO_2$ 60-70
MgO 1-10
SnO 0-<1
$AlF_3$ 0-<1
$ZrO_2$ 1-10

According to some embodiments, the further sheet comprises a glass, optionally a silicatic glass, which comprises the following components in wt % based on oxide:

$Al_2O_3$ 1-10
$K_2O$ 1-10
$Na_2O$ 1-10
$SiO_2$ 60-70
$B_2O_3$ 1-10
ZnO 1-10
S 0-<1
CaO 0-10, optionally 1-10
$TiO_2$ 0-10, optionally 1-10

According to some embodiments, the further sheet comprises a glass, optionally a silicatic glass, which comprises the following components in wt % based on oxide:

| | |
|---|---|
| $Al_2O_3$ | 10-20 |
| $B_2O_3$ | 10-20 |
| BaO | 1-10 |
| CaO | 1-10 |
| MgO | 1-10 |
| $SiO_2$ | 60-70 |
| SnO | 0-<1 |

According to some embodiments, the further sheet comprises a glass, optionally a silicatic glass, which comprises the following components in wt % based on oxide:

| | |
|---|---|
| $Al_2O_3$ | 10-20 |
| $B_2O_3$ | 10-20 |
| BaO | 1-10 |
| CaO | 1-10 |
| MgO | 1-10 |
| $SiO_2$ | 60-70 |
| SnO | 0-<1 |

Silicatic glasses in particular may be advantageous here on account of their high chemical and mechanical resistance. Different configurations are possible here, according to the precise configuration of the glass of the further sheet. For example, the further sheet may comprise a glass which is configured as borosilicate glass. Vitreous materials of that kind have very high chemical resistance and may therefore be advantageous if they are used particularly in areas in which high corrosion of the laminate may be expected. A disadvantage of such glasses, however, may be that they have a decidedly low thermal expansion, for example a linear coefficient of thermal expansion of less than $5*10^{-6}/K$, in contrast to some colored glasses, which can have fairly high thermal expansions. If the laminate in use is then subject to severe temperature changes, there may be thermal stresses here between the two sheets in the laminate, and this may be a disadvantage.

Alternatively, the further sheet may be configured such that it comprises a soda-lime glass, optionally in the form wherein the sheet is configured as a toughened soda-lime glass sheet, more particularly as a thermally toughened soda-lime glass sheet. This may be very advantageous particularly from the cost perspective, since glass sheets of this kind are readily available at low cost.

Furthermore, it is also possible, illustratively, for the further sheet to comprise a chemically toughened glass, in other words to take the form, for example, of a chemically toughened glass sheet, comprising for example an aluminium silicate glass (AS glass) or a lithium aluminium silicate glass (LAS glass). Such glass sheets can have particularly good mechanical properties, in relation for example to exposures to angular particles, of the kind which are present in a trickle test for example—or in a real-life exposure through stone chipping for example in the automotive sector.

The configuration of the laminate according to embodiments therefore makes it possible for the laminate to be flexibly adapted to the respective requirements according to the specific field of use.

Exemplary glasses are, for example, Borofloat® 33, D263® and Xensation® from SCHOTT AG.

According to some embodiments, the laminate is configured such that there is a connecting layer comprising a polymer disposed between the sheets.

Here, various configurations are possible. For example, the connecting layer may be configured as a polymer film. Such polymer films are typically 100 µm thick or even thicker, but thus also offer the advantage that differences in expansion coefficients between the glasses of the at least two sheets can be compensated. Indeed, the soft polymeric material may act here as a compensating layer between sheets having different coefficients of thermal expansion. Such a configuration may therefore be advantageous if the further sheet comprises a glass having low thermal expansion, for example a borosilicate glass.

Generally speaking, however, it is also possible for the connecting layer to be configured as what is called an optical cement. This may be, for example, a clear, transparent, light-curing polymer (photopolymer). An example of one possible optical cement is Optical Adhesive 61 from Norland Products, Inc. Such a configuration may be advantageous because with a cement of this kind it is possible to produce thinner connecting layers than with customary polymer films. Moreover, such optical cements are particularly well adapted to colored glasses and the bonding/connecting thereof. Because differences in thermal expansion between different sheets in the laminate cannot be compensated as effectively with the thinner layers possible with cements in comparison to polymer films as with thicker films, it may be advantageous to use such a cement specifically in combination with further sheet materials of fairly high expansion, such as, for example, a soda-lime glass or an aluminium silicate glass or a lithium aluminium silicate glass. Generally speaking, however, it is also possible for a sheet composed of or comprising a low-expansion glass to be connected to a sheet comprising a colored glass using an optical cement. This may also be advantageous for the reason that such optical cements can also be adapted to glass elements in terms of their refractive index, for example, and so generally are also advantageous for ensuring good optical properties, such as high transparency. Fresnel reflections as well may be at least diminished by this.

Some embodiments provide the use of a colored glass having the following glass composition in cation percent (cat %):

silicon 30-80, optionally 35-75, optionally 40-70
boron 0-20
aluminium 0-2
sodium 5-35, optionally 7.5-30, optionally 12-20, optionally 14-18
potassium 2-25, optionally 5-20, optionally 6-15
nickel 0-0.5
chromium 0-0.5
cobalt 0.03-0.5
with Σsodium+potassium is 15-50, optionally 20-45, optionally 25-30
Σnickel+chromium is 0.1-0.5 and wherein the ratio of the sum total of sodium and potassium to the sum total of nickel and cobalt is subject to:

Σsodium+potassium/Σnickel+cobalt=70:1 to 200:1.

The glass optionally has a molar ratio of potassium cations to sodium cations in the range from 0.3:1 to 0.9:1, optionally in the range from 0.4:1 to 0.8:1, optionally in the range from 0.6:1 to 0.7:1.

The expression "cation percent" here refers to the relative molar fraction of the respective cations within the total cation content (in mol). As well as cations, the glass also contains anions. The anion content is reported correspondingly in anion percent (anion %). Anions contained in the glass having the composition set out above are optionally $O^{2-}$, $F^-$, $Br^-$, $Cl^-$ and/or $SO_4^{2-}$ anions. The fraction of $O^{2-}$ ions is optionally at least 50 anion %, optionally at least 70 anion %, optionally at least 90 anion %. In some embodiments, the fraction of $O^{2-}$ ions is at least 98 anion % or even at least 99 anion %. According to some embodiments, the entire glass is oxidic, i.e. the fraction of $O^{2-}$ ions is 100 anion %.

According to some embodiments, the glass contains only a small fraction of halides ($Cl^-$, $F^-$ and/or $I^-$). The fraction of halides is optionally at most 3 anion %, optionally at most 1 anion %. The glass is optionally free of halides. Other embodiments provide a chloride content of at least 0.1 anion %, optionally at least 0.2 anion %, optionally at least 0.5 anion %, at least 1 anion %, at least 2 anion % or at least 3 anion %. According to some embodiments, the glass has a chloride content in the range from 0.5 to 10 anion %, optionally in the range from 1 to 5 anion %.

Some embodiments provide for the use as substrate of a glass having the following glass composition in cation %:

silicon 40-80, optionally 50-70, optionally 60-70
boron 0-20, optionally 1-19, optionally 5 to 15
aluminium 0-25, optionally 2-20, optionally 5-12
sodium 2-22, optionally 3-20, optionally 4-18
potassium 0.1-10, optionally 1-8, optionally 2-5
chromium 0.05-0.5, optionally 0.1-0.4, optionally 0.15-0.3
cobalt 0.03-0.5, optionally 0.04-0.3, optionally 0.05-0.2
with Σsodium+potassium=10-25, optionally 12-20, optionally 15-20

Σchromium+cobalt=0.15-0.55, optionally 0.17-0.5, optionally 0.19-0.4 and wherein the ratio of the sum total of sodium and potassium to the sum total of nickel and cobalt is subject to:

Σsodium+potassium/Σnickel+cobalt=25:1-150:1, optionally 30:1-125:1, optionally 40:1 to 90:1.

As well as cations, the glass also contains anions. The anion content is reported correspondingly in anion percent (anion %). Anions contained in the glass having the composition set out above are optionally $O^{2-}$, $F^-$, $Br^-$, $Cl^-$ and/or $SO_4^{-2}$ anions. The fraction of $O^{2-}$ ions is optionally at least 50 anion %, optionally at least 70 anion %, optionally at least 90 anion %. In some embodiments, the fraction of $O^{2-}$ ions is at least 98 anion % or even at least 99 anion %. According to some embodiments, the entire glass is oxidic, i.e. the fraction of $O^{2-}$ ions is 100 anion %.

According to some embodiments, the glass contains only a small fraction of halides ($Cl^-$, $F^-$ and/or $I^-$). The fraction of halides is optionally at most 3 anion %, optionally at most 1 anion %. The glass is optionally free of halides. Other embodiments provide a chloride content of at least 0.1 anion %, optionally at least 0.2 anion %, optionally at least 0.5 anion %, at least 1 anion %, at least 2 anion % or at least 3 anion %. According to some embodiments, the glass has a chloride content in the range from 0.5 to 10 anion %, optionally in the range from 1 to 5 anion %.

According to some embodiments, the colored glass has the following composition in wt %:

$SiO_2$ 50-80, optionally 55-75, optionally 60-73
$Al_2O_3$ 0-10, optionally 1-8, optionally 2-6
$B_2O_3$ 0-15, optionally 2-10, optionally 3-8
$Li_2O$ 0-20, optionally 3-18, optionally 6-12
$Na_2O$ 0-20, optionally 3-18, optionally 6-12
$K_2O$ 0-25, optionally 1-20, optionally 5-13
BaO 0-10, optionally 1-8, optionally 3-5
CaO 0-10, optionally 2-6, optionally 3-5
MgO 0-10, optionally 2-6, optionally 3-5
ZnO 0-10, optionally 1-8, optionally 3-5
$La_2O_3$ 0-20, optionally 1-15, optionally 2-12, optionally 5-10
$TiO_2$ 0-5, optionally 1-15, optionally 2-12
Cl 0-3, optionally 0.1-2, optionally 0.3-0.50
$MnO_2$ 1.0-5.0, optionally 1.5-4.5, optionally 2-4, optionally 2.5-3,
$Cr_2O_3$ 0.2-3, optionally 0.5-2.5, optionally 0.7-2, optionally 1-1.5 $\Sigma Na_2O+K_2O+Li_2O$=5-30, optionally 10-25, optionally 15-20. The glass composition optionally meets at least one of the following conditions: $\Sigma MnO_2+Cr_2O_3$=2.7-8, optionally 3-7, optionally 3.5-5.5 and/or $MnO_2/CrO_3$=1.5:1 to 12.5:1, optionally 1.6:1 to 10:1, optionally 1.7:1 to 7.5, optionally 1.9:1 to 4:1.

According to some embodiments, the laminate comprises a second further sheet composed of or comprising glass, wherein the sheet comprising the colored glass is disposed between the further and the second further sheets.

An implementation of this kind may be advantageous, because in this way a construction is produced in which the colored glass is protected by the two further sheets. Disposed between the respective further sheet and the sheet comprising the colored glass in each case is a connecting layer, and so the sheets are held and fixed mutually in their position relative to one another. This layer may optionally be configured in each case such that it comprises a polymer, in the form of an optical cement or in the form of a polymer film, for example.

With such a configuration it is possible to achieve especially high resistance towards mechanical and chemical exposures. The reason is that in this way, the colored glass, which has relatively low mechanical and chemical stability, is protected on both sides against exposures.

It is possible for both further sheets to comprise the same material or different materials. Consideration may even be given here to forming one sheet of glass, but the second further sheet of a plastic. Owing to the generally better stability of a glass, however, an exemplary embodiment is that in which both further sheets comprise a glass or consist of a glass. Furthermore, it may be advantageous if both sheets comprise the same vitreous material.

According to some embodiments, the sheet comprising a colored glass has a coefficient of thermal expansion (coefficient of linear thermal expansion $\alpha$) in the temperature range between $-30°$ C. to $70°$ C. of between $7*10^{-6}$/K and $11*10^{-6}$/K, wherein optionally the amount of the difference between the coefficients of thermal expansion of the sheet comprising a colored glass and of the further sheet is at most $8*10^{-6}$/K, optionally less than $6*10^{-6}$/K and optionally less than $4*10^{-6}$/K.

Where the present disclosure refers to the coefficient of thermal expansion, the reference is to the coefficient of linear thermal expansion $\alpha$, which is determined here optionally in the temperature range between $-30°$ C. and $+70°$ C. The reported value is the nominal coefficient of mean linear thermal expansion according to ISO 7991, determined in a static measurement.

A configuration of this kind as described above may be advantageous when large temperature fluctuations occur in the operation of the electronic component protected by the laminate. In this case, indeed, the coefficients of thermal expansion of the sheets in the laminate are harmonized with one another and accordingly there can be no mechanical stresses in the laminate large enough to generate delaminations in the laminate.

According to some embodiments, the further sheet comprises or consists of a borosilicate glass, optionally a floated or drawn borosilicate glass, optionally a polished borosilicate glass. A borosilicate glass may be advantageous because these glasses have particularly good chemical and mechanical stabilities.

The borosilicate glass or the sheet comprising it or consisting thereof may be floated or drawn. Further exemplary is a configuration in which the further sheet comprises or consists of a borosilicate glass—for example, a floated or drawn borosilicate glass, which is optionally polished, meaning that the sheet comprises or consists of a polished borosilicate glass. With this configuration, not only is a mechanically and chemically stable configuration of the laminate possible, but at the same time very good optical properties of the laminate are also provided in this way. Indeed, surface irregularities such as roughness or waviness in the sheet surface affect the image quality, since consequent unwanted refractivities impair the modulation transfer function (MTF).

According to some embodiments, there are elevations on one of the main surfaces of the further sheet, more particularly elongate elevations which elevate substantially in normal direction and which have a longitudinal extent greater than two times, optionally three times, optionally five times a transverse extent of the elevation and have a height which on average, adjusted to exclude wedge-shaped fluctuations in thickness and bulges and on arithmetic averaging of an analysis area of $10*10$ cm$^2$, is less than 100 nm, optionally less than 90 nm, optionally less than 80 nm, and for which the transverse extent of the elevation is in each case less than 40 mm. In this way, as a result of the surface alterations, unwanted refractivities can be reduced to particularly good effect. According to such embodiments, therefore, the quality of transmittance of image information through the laminate is particularly good. Generally speaking, therefore, it is possible to ensure that the wave front is affected only to a very low extent.

According to some embodiments, the laminate has a thermal stability of at least 70° C. durably, i.e. for at least 50 h, and optionally of 120° C. briefly, i.e. for at least 0.5 h.

According to some embodiments, the laminate is configured such that at least one sheet has a coating on at least one side. The coating may generally have a further function, being configured for example as an anti-reflection coating, as a scratch resistance coating, as an optical coating, with color reflection for example, as an air-conditioning coating, as an easy-to-clean coating, as a hydrophobic, oleophobic, anti-frost, anti-fog and/or heatable coating. The coating may be implemented as a multi-layer coating, thus comprising multiple layers. It is possible for the coating to fulfil different functions at the same time—in other words, an optical coating for generating an anti-reflection effect, for example, has an uppermost layer which is implemented for example as an anti-fog coating or hydrophobic coating.

A laminate according to some embodiments may be used as a cover sheet, more particularly as a cover sheet for a laser, more particularly of a laser as part of a LIDAR system, or for an imaging system, more particularly for an imaging system of an instrument for 3D measurement of the surroundings or for measurement of velocity.

EXAMPLE

As a working example, a colored glass having a thickness of 1.8 mm was cemented using an optical cement to a borosilicate glass (available commercially under the name "Borofloat 33") having a thickness of 2 mm. The colored glass has the following composition in wt %:
$SiO_2$ 68.0
$B_2O_3$ 3.0
$Na_2O$ 12.0
$K_2O$ 5.0
BaO 4.0
ZnO 1.8
Cl 0.5
$MnO_2$ 3.1
$Cr_2O_3$ 1.3.

Referring now to the drawings, FIGS. 1A and 1B here show, in each case schematically and not to scale, a side view in FIG. 1A and also a perspective representation in FIG. 1B of a laminate 1 according to embodiments.

FIG. 1A depicts a side view of a laminate 1 according to some embodiments. The laminate 1 here comprises a sheet 12 comprising a colored glass, a further sheet 10, and a polymeric layer 11 disposed between the sheets 10 and 12. The two sheets may generally have thicknesses of between 1.5 mm and 3 mm or else even lower thicknesses, according to the intended use. Generally speaking, it may be advantageous if in regions subject to severe mechanical exposure, the laminate 1 has a greater thickness, particularly in this case the sheet 10, which is particularly subject to mechanical exposures. Generally speaking, it may be advantageous for the laminate to have a thickness of at most 6 mm and optionally of at least 1 mm.

In a wavelength range of 400 to 700 nm, the composite 1 has an average transmittance $\tau_{avg, 400\,nm\,to\,700\,nm}$ of less than 15%, optionally less than 10%, wherein $T_{avg,\,400\,nm\,to\,700\,nm}$ is defined as $$\tau_{avg,400\,nm-700\,nm} = \frac{\int_{400\,nm}^{700\,nm} \tau d\lambda}{700\,nm - 400\,nm}$$

or at each wavelength has a spectral transmittance of less than 10%, optionally less than 5% and optionally of less than 1%. The sheet 12 which comprises the colored glass has, in the wavelength range from 875 nm to 1600 nm, an internal transmittance at at least one wavelength of at least 80%, optionally at least 85%, optionally at least 90%, optionally at least 95%, optionally at least 97%.

Generally speaking, provision may be made for coatings to be disposed on the sides 100 and 120 of the laminate. Sides in this context are regarded generally, for the purposes of the present invention, as the main faces of a sheet-like body which are defined by the two greatest lateral dimensions of the body (generally, by length and width). A body is sheet-like if it has an aspect ratio of at least 1:5, in other words if its lateral dimension in one spatial direction in a cartesian coordinate system is at most one fifth of the lateral dimensions of the body in the two other spatial directions perpendicular to the first spatial direction. In other words, the sheet-like or plate-shaped body is less thick than it is long and wide. Sheet-like and plate-shaped are used synonymously for the purposes of the present disclosure.

The two sheets 10 and 12 each have two sides, with the sides 100 and 120 each facing away from the polymeric layer 11 in the laminate 1; these sides may also be referred to as outer sides of the laminate. The coating, not depicted, may as observed be disposed on one of the two sides 100 and 120, optionally on the side 100 which is subject to the greater mechanical and chemical exposures, especially when the coating is embodied as an abrasion-resistant coating. A dirt-repellent coating on the side 100 may also be advantageous. In general, however, it is also possible for the coating to be disposed, alternatively or additionally, on the side 120. Also possible are configurations in which the coating is disposed on that side of the sheet 10 and/or 12 that is in contact with the polymeric layer 11.

Other than is represented schematically and not to scale in FIG. 1A, the sheets 10 and 12 may have different thicknesses. In general, moreover, the polymeric layer 11 will also be substantially thinner than the two sheets 10 and 12.

FIG. 1B, lastly, shows a perspective representation of a laminate 1 having sheets 10, 12 and also the layer 11 disposed between these sheets.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laminate, comprising:
   at least two sheets, one of the at least two sheets comprising a colored glass and another of the at least two sheets comprising a further sheet, wherein the sheet comprising the colored glass in a wavelength range from 875 nm to 1600 nm has an internal transmittance at at least one wavelength of at least 75%; and
   a connecting layer disposed between the at least two sheets, the laminate having a thickness of at most 6 mm, and wherein the laminate in a wavelength range from 400 to 700 nm has an average transmittance $\tau_{avg,400\,nm\,to\,700\,nm}$ of less than 15% where $\tau_{avg,400\,nm\,to\,700\,nm}$ is defined as $$\tau_{avg,400\,nm-700\,nm} = \frac{\int_{400\,nm}^{700\,nm} \tau d\lambda}{700\,nm - 400\,nm}$$

and/or at each wavelength has a spectral transmittance of less than 15%.

2. The laminate of claim 1, wherein the thickness of the laminate is at least 1 mm.

3. The laminate of claim 1, wherein the laminate at each wavelength has a spectral transmittance of less than less than 1%.

4. The laminate of claim 1, wherein the further sheet comprises at least one of a glass, a borosilicate glass, a toughened soda-lime glass, a chemically toughened soda-lime glass, an aluminium silicate glass, a chemically toughened aluminium silicate glass, a lithium aluminium silicate glass, or a chemically toughened lithium aluminium silicate glass.

5. The laminate of claim 1, further comprising a connecting layer comprising a polymer that is disposed between the at least two sheets.

6. The laminate of claim 1, wherein the colored glass comprises the following components in cation %:
silicon 30-80;
boron 0-20;
aluminium 0-2;
sodium 5-35;
potassium 2-25;
nickel 0-0.5;
chromium 0-0.5; and
cobalt 0.03-0.5;
wherein Σsodium+potassium is 15-50, Σnickel+chromium is 0.1-0.5, and a ratio of the sum total of sodium and potassium to the sum total of nickel and cobalt is subject to: Σsodium+potassium/Σnickel+cobalt=70:1 to 200:1.

7. The laminate of claim 1, wherein the colored glass comprises the following components in cation %:
silicon 40-80;
boron 0-20;
aluminium 0-25;
sodium 2-22;
potassium 0.1-10;
chromium 0.05-0.5; and
cobalt 0.03-0.5;
wherein Σsodium+potassium=10-25, Σchromium+cobalt=0.15-0.55, and a ratio of the sum total of sodium and potassium to the sum total of nickel and cobalt is subject to: Σsodium+potassium/Σnickel+cobalt=25:1-150:1.

8. The laminate of claim 1, wherein the colored glass comprises a composition with the following components in wt %:
$SiO_2$ 50-80;
$Al_2O_3$ 0-10;
$B_2O_3$ 0-15;
$Li_2O$ 0-20;
$Na_2O$ 0-20;
$K_2O$ 0-25;
BaO 0-10;
CaO 0-10;
MgO 0-10;
ZnO 0-10;
$La_2O_3$ 0-20;
$TiO_2$ 0-5;
Cl 0-3;
$MnO_2$ 1.0-5.0; and
$Cr_2O_3$ 0.2-3;
wherein $\Sigma Na_2O+K_2O+Li_2O=5-30$.

9. The laminate of claim 8, wherein the composition of the colored glass meets at least one of the following conditions:

$\Sigma MnO_2+Cr_2O_3=2.7-8$; or $MnO_2/CrO_3=1.5:1$ to $12.5:1$.

10. The laminate of claim 1, further comprising a second further sheet comprising glass, wherein the sheet comprising the colored glass is disposed between the further sheet and the second further sheet.

11. The laminate of claim 1, wherein the sheet comprising the colored glass has a coefficient of thermal expansion $\alpha_{-30°\ C.\ to\ 70°\ C.}$ of between $7*10^{-6}/K$ and $11*10^{-6}/K$.

12. The laminate of claim 11, wherein an amount of a difference between the coefficient of thermal expansion of the sheet comprising a colored glass and a coefficient of thermal expansion of the further sheet is at most $8*10^{-6}/K$.

13. The laminate of claim 12, wherein the amount of the difference between the coefficient of thermal expansion of the sheet comprising a colored glass and a coefficient of thermal expansion of the further sheet is less than $6*10^{-6}/K$.

14. The laminate of claim 1, wherein the further sheet comprises a borosilicate glass.

15. The laminate of claim 14, wherein the borosilicate glass is at least one of a floated borosilicate glass, a drawn borosilicate glass, or a polished borosilicate glass.

16. The laminate of claim 1, wherein the further sheet comprises elevations on one of the surfaces of the further sheet, wherein the elevations are elongate elevations which each elevate substantially in a normal direction and which have a longitudinal extent greater than two times a corresponding transverse extent of the elevation and have a height which on average, adjusted to exclude wedge-shaped fluctuations in thickness and bulges and on arithmetic averaging of an analysis area of $10*10\ cm^2$, is less than 100 nm and for which the transverse extent of the elevation is in each case less than 40 mm.

17. The laminate of claim 1, wherein the laminate has a thermal stability of at least 70° C. for at least 50 hours.

18. The laminate of claim 17, wherein the thermal stability is up to 120° C. for at least 0.5 hours.

* * * * *